Figure 4:
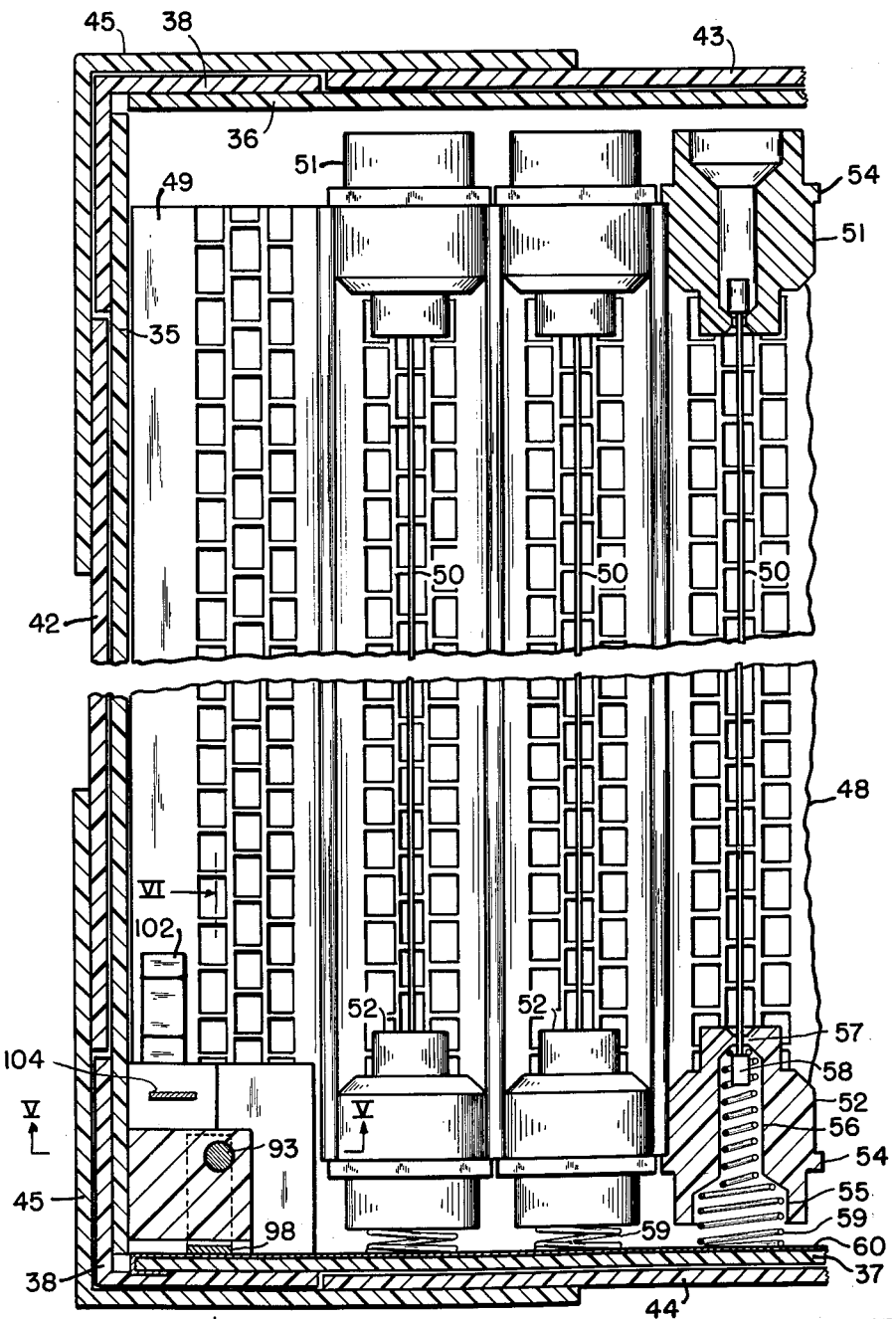

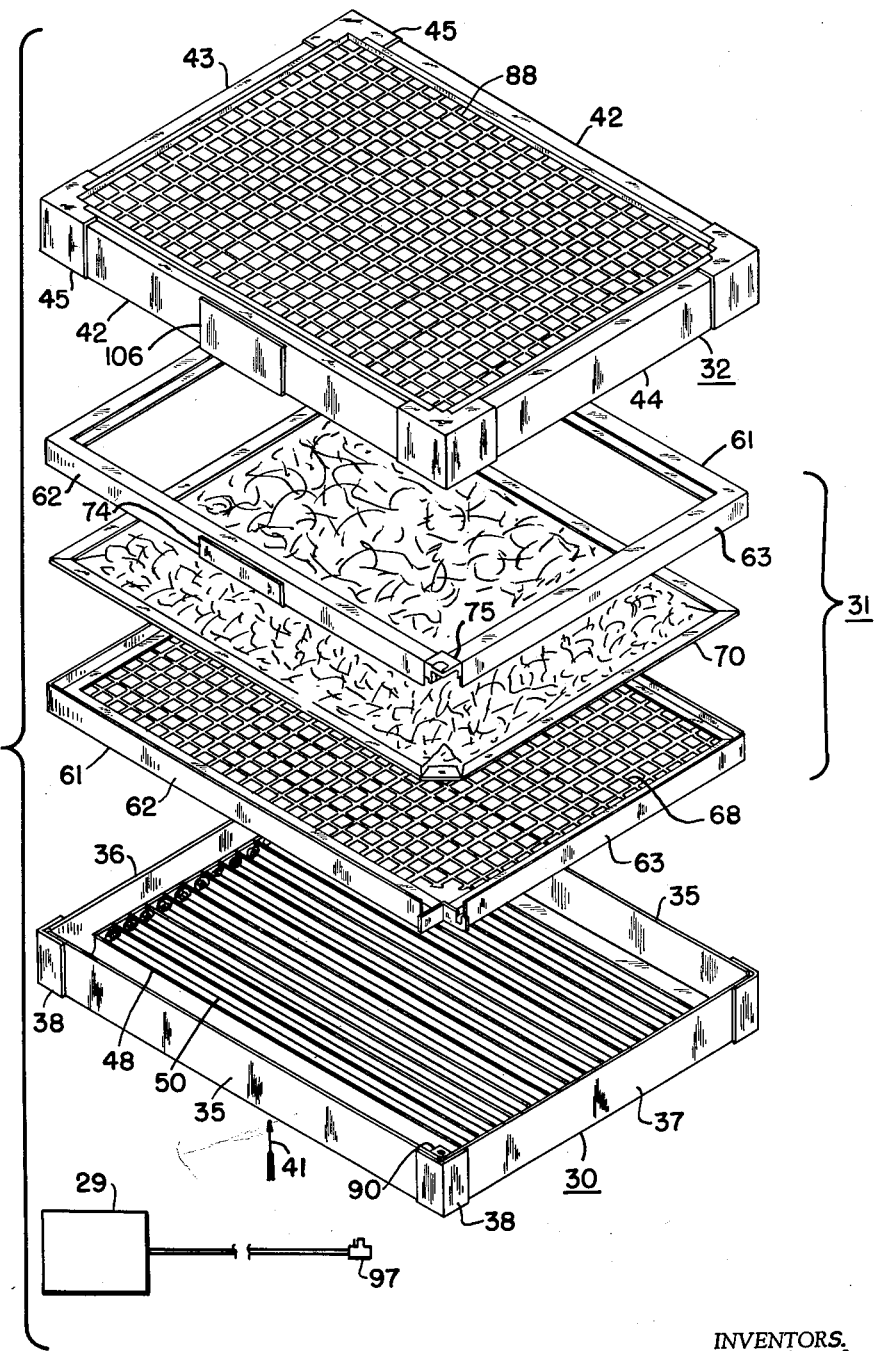

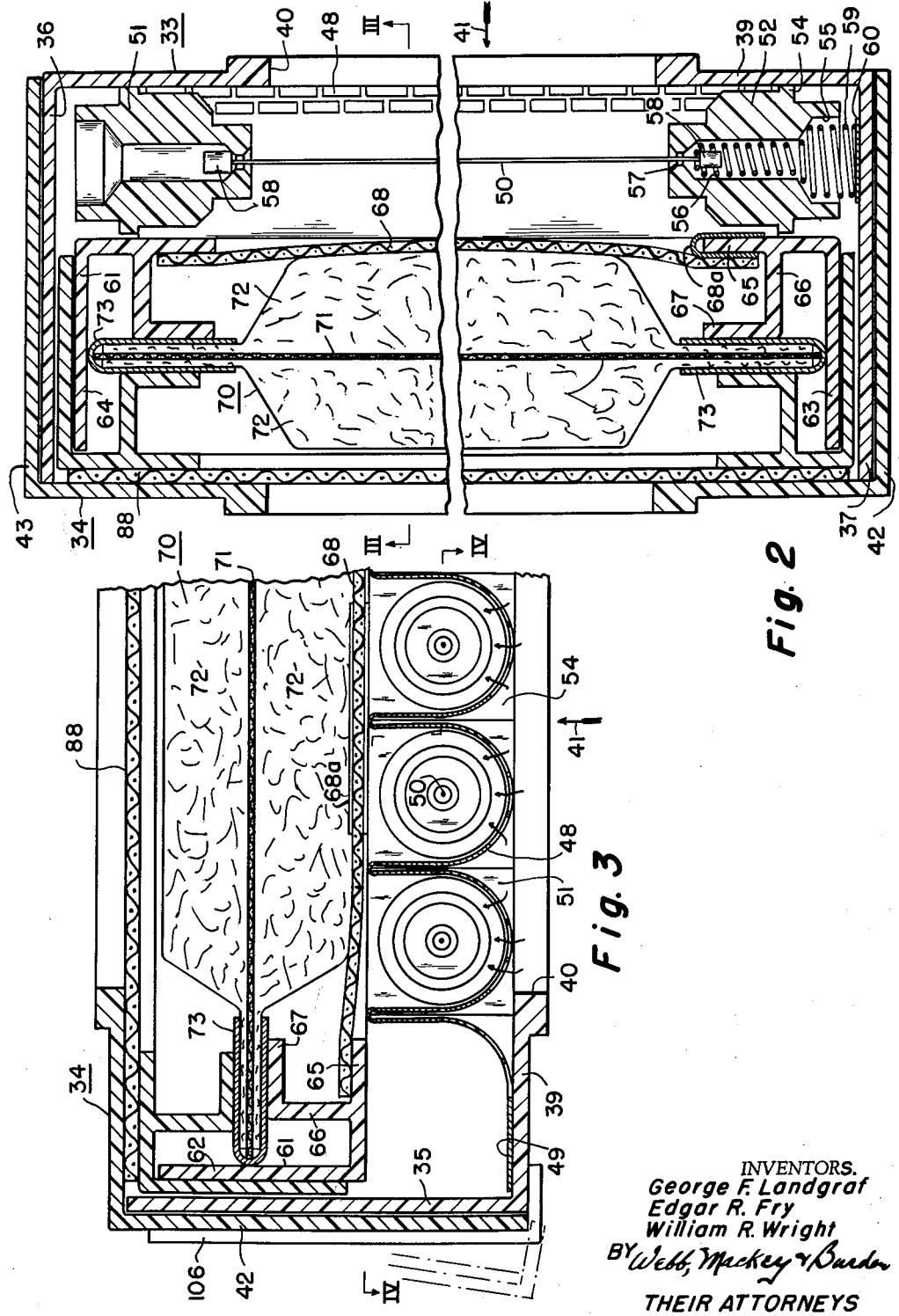

INVENTORS.
George F. Landgraf
Edgar R. Fry
William R. Wright
BY Webb, Mackey + Burden
THEIR ATTORNEYS INVENTORS.
George F. Landgraf
Edgar R. Fry
William R. Wright

THEIR ATTORNEYS

INVENTORS.
George F. Landgraf
Edgar R. Fry
William R. Wright
BY Webb, Mackey & Burden
THEIR ATTORNEYS Jan. 15, 1963    G. F. LANDGRAF ET AL    3,073,094
ELECTROSTATIC FILTER PANEL
Filed May 23, 1960    13 Sheets-Sheet 6
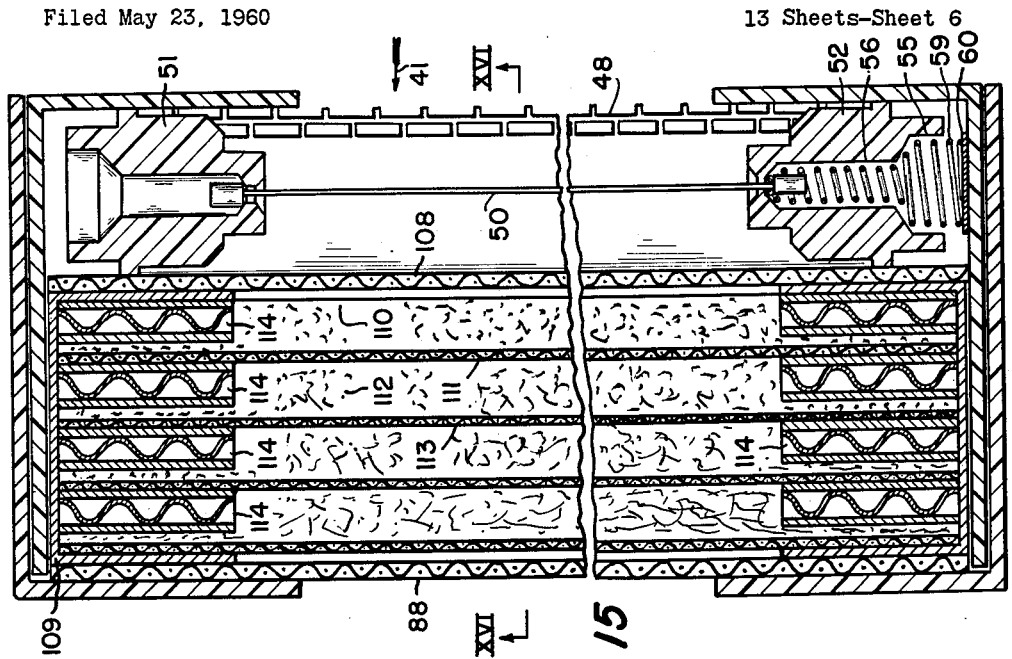
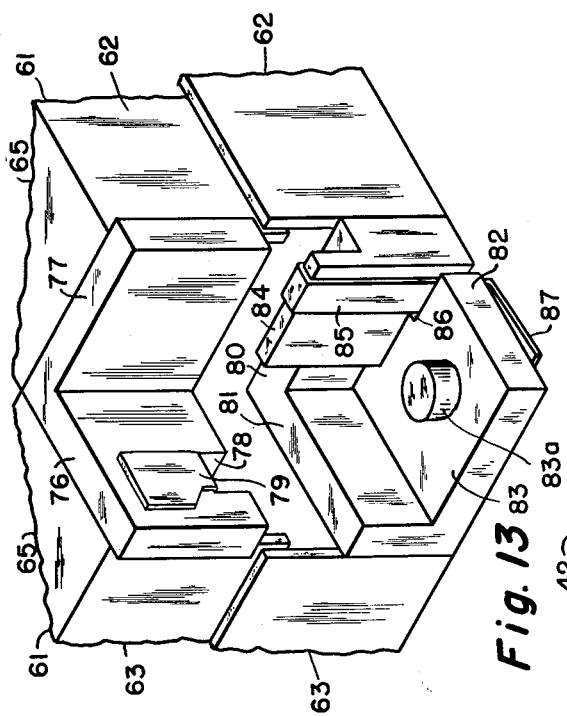
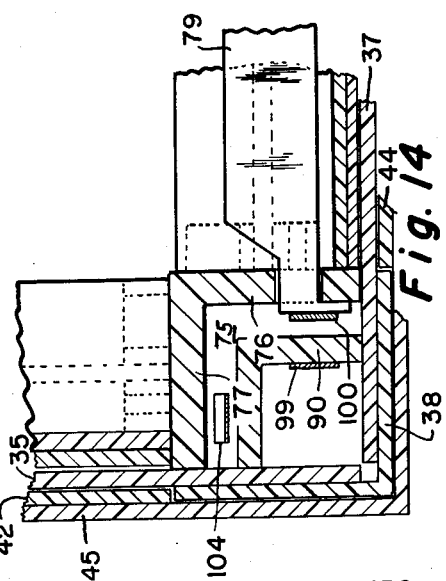
INVENTORS.
George F. Landgraf
Edgar R. Fry
William R. Wright
BY Webb, Mackey + Burden
THEIR ATTORNEYS Jan. 15, 1963 G. F. LANDGRAF ET AL 3,073,094
ELECTROSTATIC FILTER PANEL
Filed May 23, 1960 13 Sheets-Sheet 7

INVENTORS.
George F. Landgraf
Edgar R. Fry
William R. Wright

BY Webb, Mackey + Burkin

THEIR ATTORNEYS

INVENTORS.
George F. Landgraf
Edgar R. Fry
William R. Wright

BY Webb, Mackey & Burden

THEIR ATTORNEYS

Jan. 15, 1963  G. F. LANDGRAF ET AL  3,073,094
ELECTROSTATIC FILTER PANEL
Filed May 23, 1960  13 Sheets-Sheet 9

INVENTORS.
George F. Landgraf
Edgar R. Fry
William R. Wright
BY Webb, Mackey & Burden
THEIR ATTORNEYS INVENTORS.
George F. Landgraf
Edgar R. Fry
William R. Wright
BY Webb, Mackey + Burde

THEIR ATTORNEYS

INVENTORS.
George F. Landgraf
Edgar R. Fry
William R. Wright
BY Webb, Mackey + Burde
THEIR ATTORNEYS

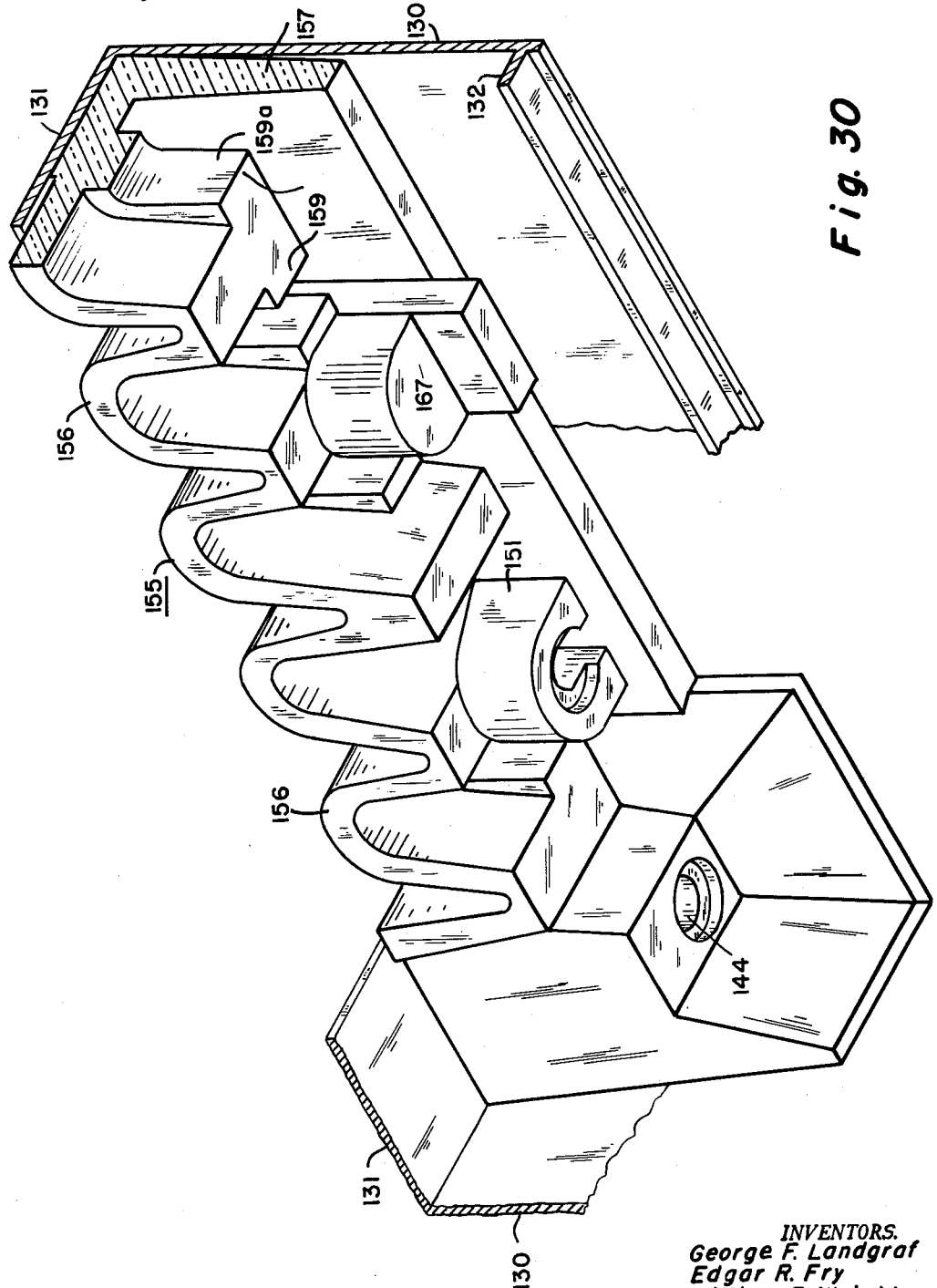

United States Patent Office 3,073,094
Patented Jan. 15, 1963

3,073,094
ELECTROSTATIC FILTER PANEL
George F. Landgraf, Mount Lebanon Township, Allegheny County, Edgar R. Fry, Kennedy Township, Allegheny County, and William R. Wright, Dormont, Pa., assignors to Trion, Inc., McKees Rocks, Pa., a corporation of Pennsylvania
Filed May 23, 1960, Ser. No. 32,506
13 Claims. (Cl. 55—131)

There has long been a demand for a truly efficient air filter which occupies a relatively small space and has a simple means for disposing of dirt which it collects from air passing through it. Heretofore, the only truly efficient filters have been electrostatic filters in which dirt particles are collected on metal plates or large mechanical filters which produce a substantial pressure drop in its flow of air. Such filters, however, occupy a large space and it has been difficult to remove dirt collected on their plates. Also, they have been relatively expensive.

It is conventional to use so-called "mechanical" filters, particularly in connection with forced air systems, in which a panel of fibrous material is placed across the entry duct of a furnace. Such mechanical filters, however, have been very inefficient, particularly for the collection of fine particles below 5-micron size, which particles are primarily responsible for the soiling of drapes, carpeting, and furniture. To improve such mechanical filters, it has been proposed to establish an electrostatic charge across the fibers making up the filter. The addition of the electrostatic charge has increased the efficiency of the mechanical filter, but the efficiency is still far below that which is desirable.

We have invented a filter which is a true electrostatic filter but which occupies only the same amount of space as the conventional mechanical filters. It has an efficiency of 70%, as determined by the National Bureau of Standards' Dust Spot Test, as compared with an efficiency of 8% for mechanical filters. The parts which collect the dirt can be easily removed and discarded, or they can be vacuumed or washed to remove the dirt and used over again. The filter has a minimum number of parts and, therefore, it can be maintained with relatively little difficulty and expense.

The filter is a true electrostatic filter, as distinguished from the "charged" mechanical filters, in that our filter imparts a charge to the dust particles to insure precipitation, whereas the "charged" mechanical filters have been effective, if at all, only because the dust particles in the air being cleaned were charged before reaching the filter. Since our filter panel is a true electrostatic filter, it collects particles below 5 microns in size and is nonselective as to particle size.

Our filter normally uses electric power in the range of 15 to 25 watts and, therefore, has a low operating cost. The filter can be manufactured at a cost considerably below that of the conventional electrostatic filters having metal plates on which particles removed from the air are collected.

Figure 5:
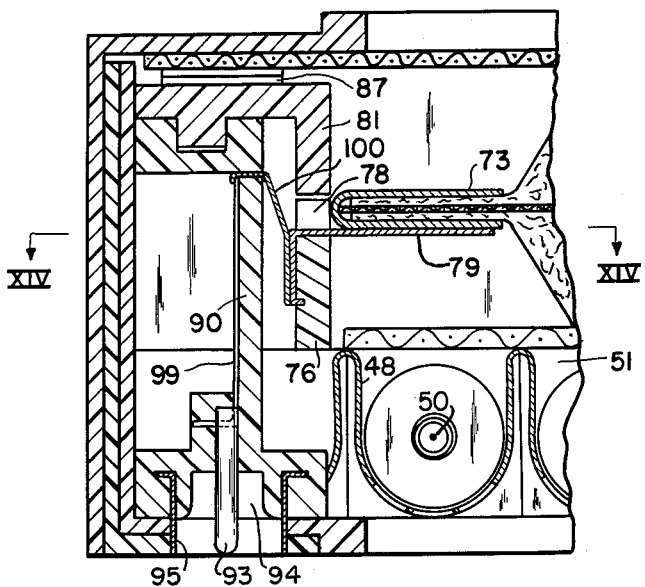
Figure 6:
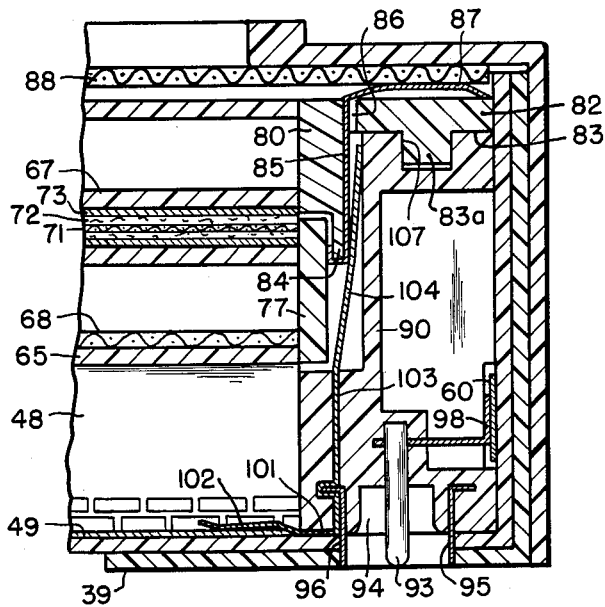
Figure 7:
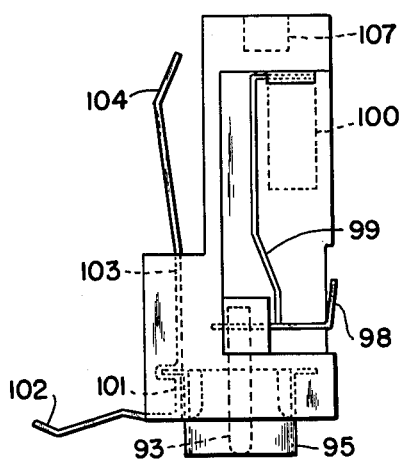
Figure 8:
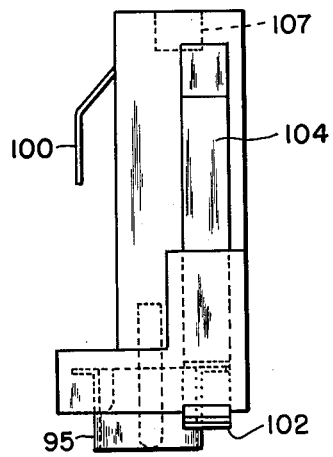
Figure 9:
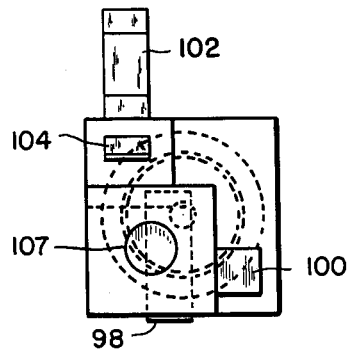
Figure 10:
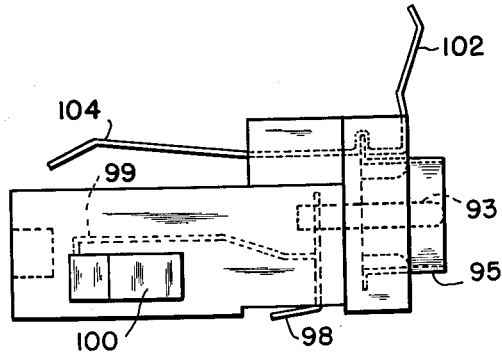
Figure 11:
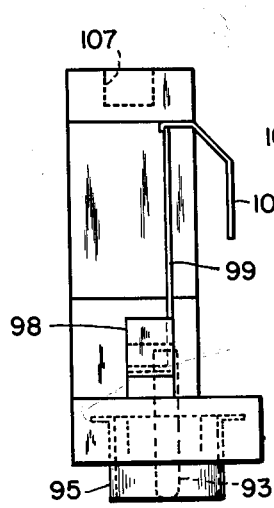
Figure 12:
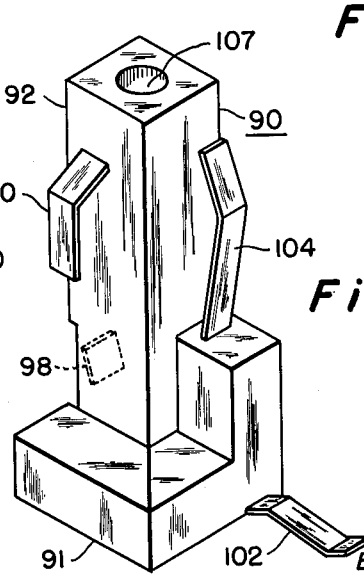
Figure 16:
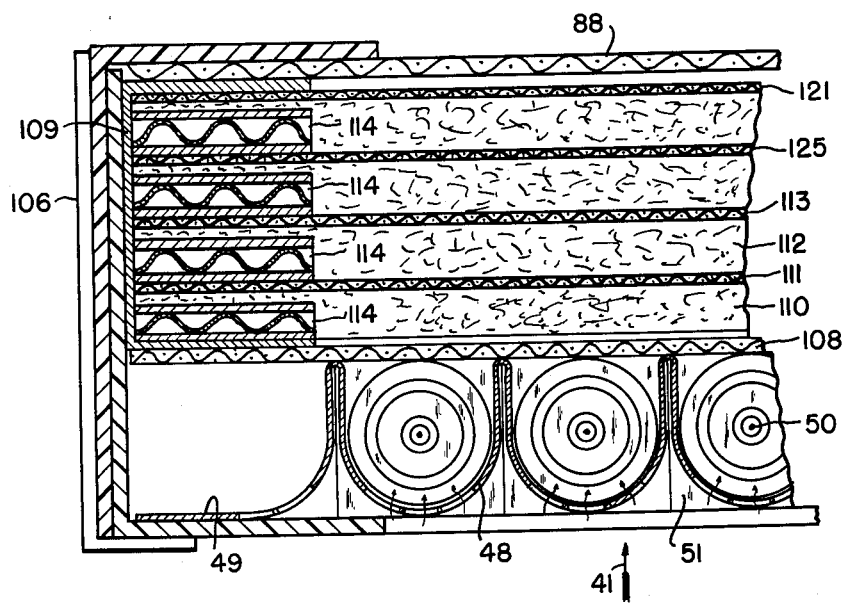
Figure 17:
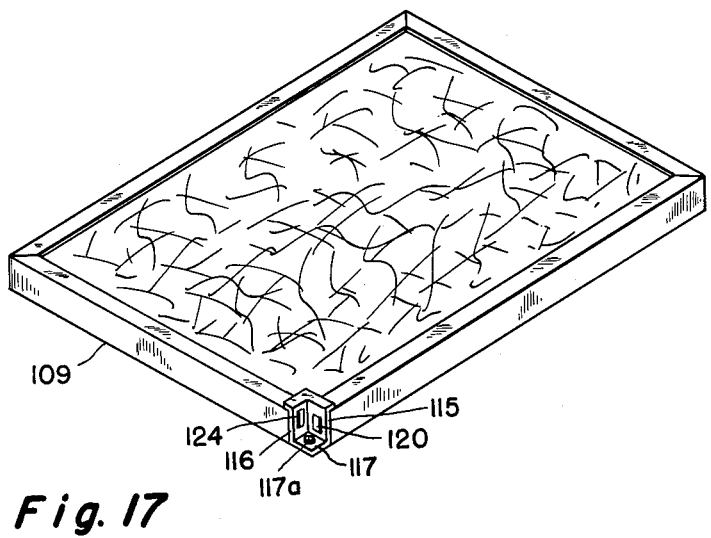
Figure 18:
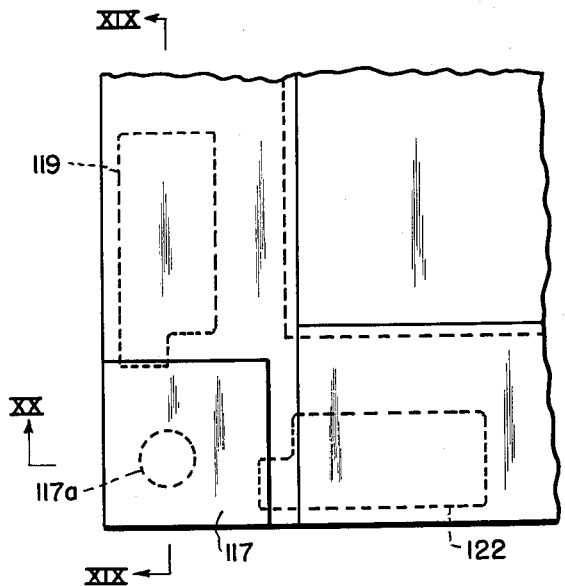
Figure 19:
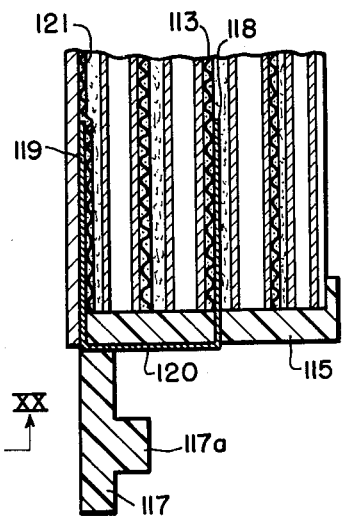
Figure 20:
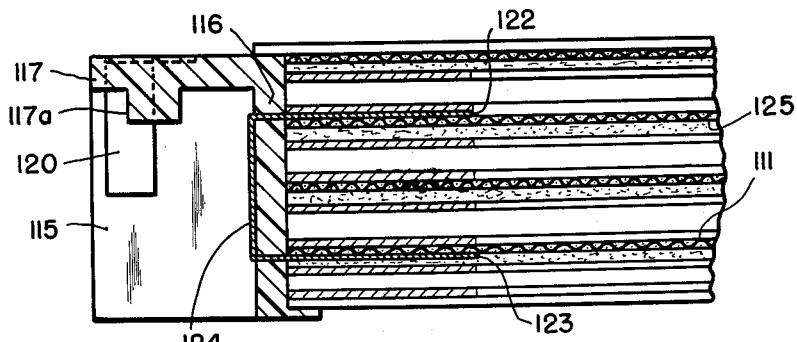
Figure 21:
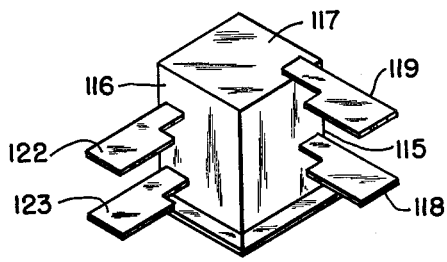
Figure 22:
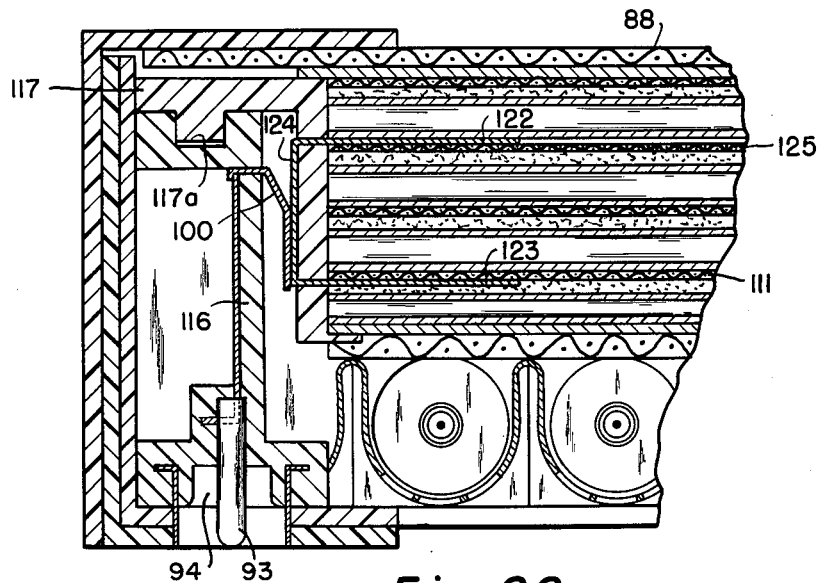
Figure 23:
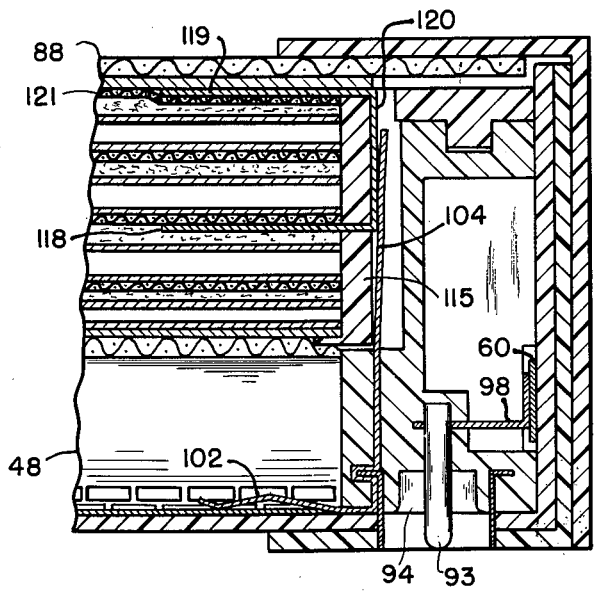
Figure 24:
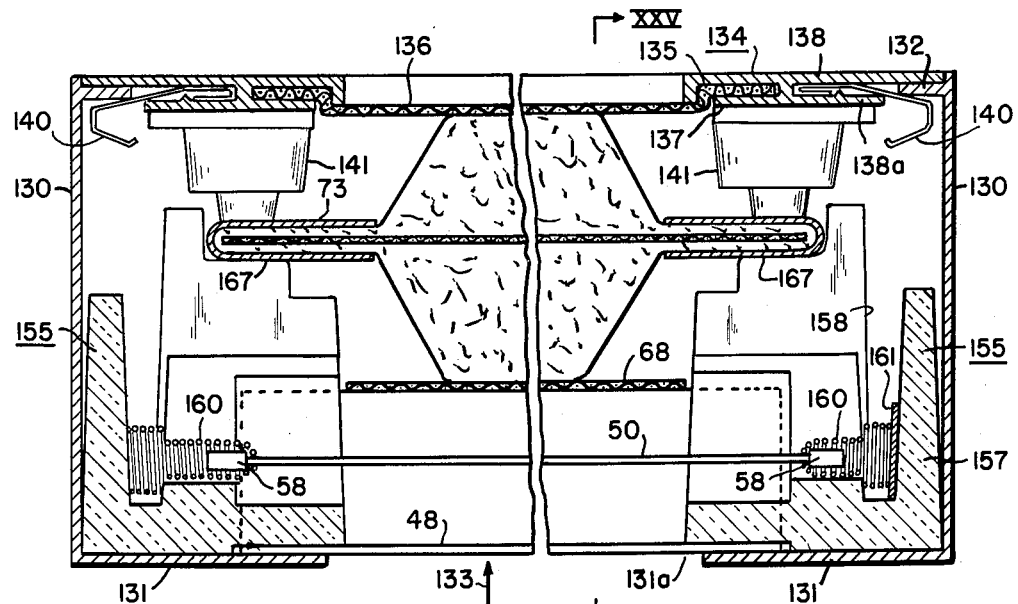
Figure 25:
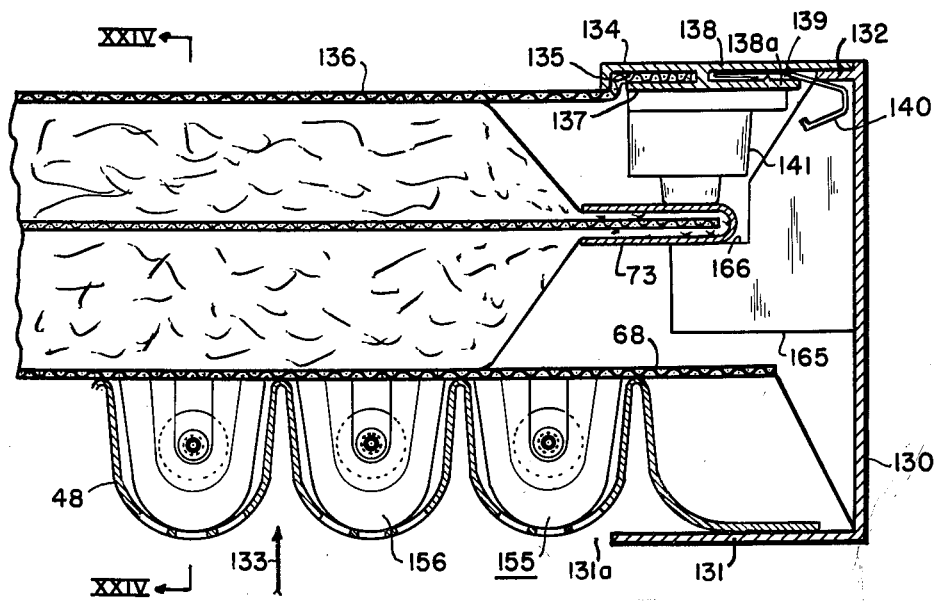
Figure 26:
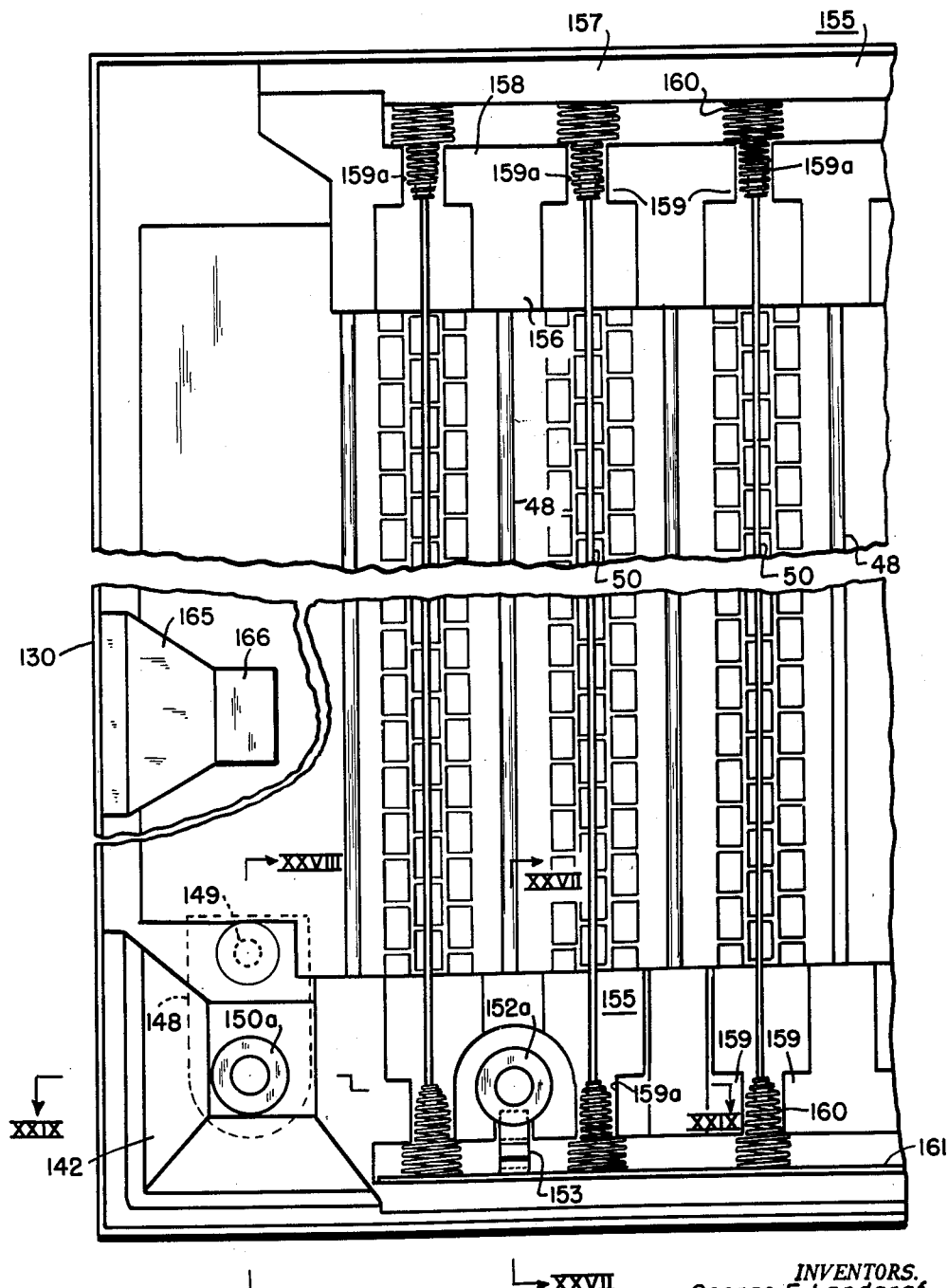
Figure 27:
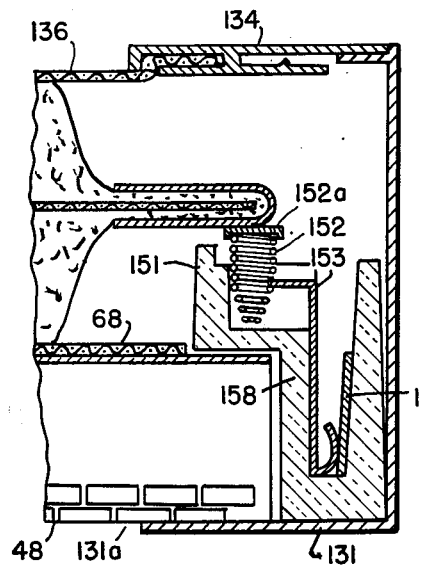
Figure 28:
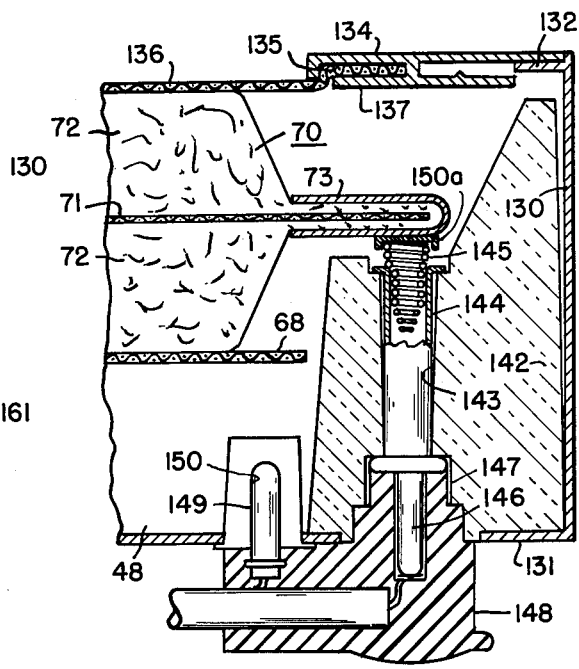
Figure 29:
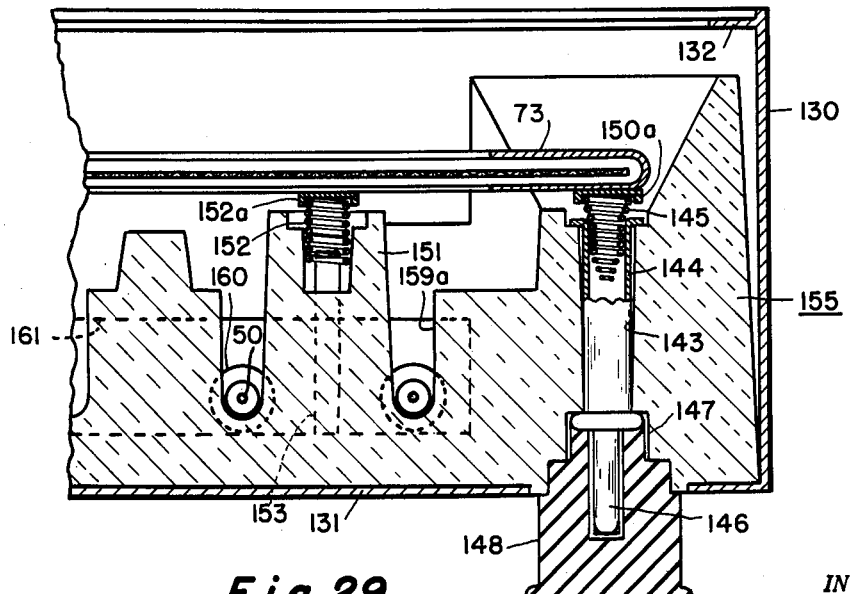

In the drawings, we have described a present preferred embodiment of our invention, in which:

FIGURE 1 is an exploded view of our filter panel;
FIGURE 2 is a vertical cross-section through an assembled filter panel;
FIGURE 3 is a cross-section taken on line III—III of FIGURE 2;
FIGURE 4 is a cross-section taken on line IV—IV of FIGURE 3;
FIGURE 5 is a cross-section taken on line V—V of FIGURE 4;
FIGURE 6 is a cross-section taken on line VI—VI of FIGURE 4;
FIGURE 7 is a left side elevation view of a connector plug used in our panel;
FIGURE 8 is an elevation view at right angles to FIGURE 7 of a connector plug used in our panel;
FIGURE 9 is a plan view from downstream side of a connector plug used in our panel;
FIGURE 10 is an elevation view from the opposite side to FIGURE 7 of a connector plug used in our invention;
FIGURE 11 is an elevation view from the opposite side to FIGURE 8 of a connector plug used in our invention;
FIGURE 12 is a perspective view of a connector plug used in our invention;
FIGURE 13 is a perspective view of a corner connector used in a pad holding frame in our panel;
FIGURE 14 is a cross-section taken on line XIV—XIV on FIGURE 5;
FIGURE 15 is a vertical cross-section, similar to FIGURE 2, of a modified type of filter panel;
FIGURE 16 is a cross-section taken on line XVI—XVI of FIGURE 15;
FIGURE 17 is a perspective of a modified form of collecting pad used in our filter panel;
FIGURE 18 is an enlarged view of a lower corner of the modified cleaning pad used in our filter panel;
FIGURE 19 is a cross-section taken on line XIX—XIX of FIGURE 18;
FIGURE 20 is a cross-section taken on line XX—XX of FIGURE 18;
FIGURE 21 is a perspective view of a corner connector viewed on a pad holding frame of our filter panel;
FIGURE 22 is a cross-section similar to FIGURE 5 but showing the modified collector unit of our filter panel;
FIGURE 23 is a view similar to FIGURE 6 but showing a modified form of collector pad;
FIGURE 24 is a horizontal cross-section through a modified filter panel;
FIGURE 25 is a vertical cross-section taken on line XXV—XXV of FIGURE 24;
FIGURE 26 is a plan view, partly in cross-section, with the cover removed, of the filter panel of FIGURE 24;
FIGURE 27 is a cross-section taken on line XXVII—XXVII of FIGURE 26;
FIGURE 28 is a cross-section taken on line XXVIII—XXVIII of FIGURE 26;
FIGURE 29 is a cross-section taken on line XXIX—XXIX of FIGURE 26; and
FIGURE 30 is a perspective of part of the inside of the filter panel of FIGURE 24.

Briefly, our filter panel consists of an ionizing unit 30, a collection unit 31, and an outside panel frame 32. A power pack 29 is provided for the filter panel and supplies high voltage to the panel. The ionizing unit has a plurality of parallel wires around which passes the incoming impure air. These wires give a charge to the particles in the air such that upon passing to the collecting unit 31 the particles are collected in a pad. The pure air then passes rearwardly out of the rear frame 32.

We have found that by constructing the ionizing unit in the manner to be described hereinafter, very little air can by-pass the ionizing and collecting units.

In the collecting unit, a conductive coated cotton mesh is placed between two or more layers of fibrous pads; the cotton mesh carries a high voltage in a manner similar to the ionizing wires. Ground electrodes are positioned on each side of the fibrous material. Thus, a potential gradient is established along each fiber of the pad creating an electrostatic field which attracts charged particles to the fibers.

Our entire assembled filter panel is of relatively small thickness in the direction of the air flow. Preferably, we limit the thickness of the panel to a maximum of 2 inches.

By maintaining this dimension we can substitute our electrostatic filter for most conventional mechanical filters without changing the air duct work.

Referring specifically to FIGURES 2, 3 and 4, an outside frame assembly enclosing the filter panel consists of an upstream frame 33 and a downstream frame 34. The frame 33 has two side walls 35, an upper wall 36 and a lower wall 37. The walls are united and reinforced at their corner junctures by reinforcing plates 38. A front face plate 39 is joined to the side walls and has an opening 40 therein for admission of impure air in the direction of arrow 41 on FIGURE 2.

The downstream frame 34 is of construction similar to the frame 33 in that the side walls 42, a bottom wall 44 and a top wall 43 are united at their corners by reinforcing plates 45. The frame 33 fits inside the frame 34 in the manner shown in FIGURES 2 and 4, with a reinforcing plate on the frame 33 intermeshing with the reinforcing plates 45 and side wall 42 and top wall 43, in the manner shown in FIGURE 4.

The outside frame assembly is fabricated from high impact strength polystyrene having a dielectric strength of 175 volts per mill.

Immediately behind the opening 40 on the front frame 33 is the ionizing wire assembly. This assembly includes an ionizer ground electrode 48 which is bent in a semi-circular configuration as shown in FIGURE 3. The ground electrode 48 is formed from .020" perforated aluminum sheet. The perforations are ¼" square with a .039" bar in a staggered pattern. The perforations are arranged so that they form only the upstream semi-circular half of the ionizer cages 48. The straight sides of these cages are unperforated. The cages 48 function as supports for the ionizing wires in the manner to be described hereinafter and thus must be reasonably rigid. The cages 48 also function as a "pre-filter" and lint screen to prevent large particles from entering the ionizing wire assembly. The semi-circular configuration of the cages 48 allows simple, inexpensive fabrication of the cages and easy assembly of the ionizing unit. The ground electrode does not extend the entire height of the front frame 33, as shown in FIGURE 4.

An ionizing wire 50 is positioned at about the radius center of the curved portion of the ground electrode 48. This wire is preferably .006" in diameter and fabricated from tungsten. The wire is held in position by an upper wire centering device 51 and a lower wire centering device 52. These devices are identical in construction and are fabricated from medium impact strength polystyrene having a dielectric strength of about 500 volts per mil. The wire centering devices are circular in configuration with the exception of a continuous square shoulder 54. The wire centering devices are hollow with a circular configuration having an enlarged portion 55 which narrows down to a portion of lesser diameter 56 which in turn narrows down to a small opening 57 of sufficient size to admit the wire 50. A clinch barrel 58 is affixed to each end of the wire 50. The upper wire centering device 51 is of such diameter that its lower portion fits in the circular part of the ground electrode 48 in the manner shown in FIGURE 4 with the continuous square flange 54 positioned on the upper edge of the ground electrode 48. The lower wire centering device 52 is inverted and is positioned within the ground electrode 48 in the same manner as device 51. A spring 59 positioned inside the lower wire centering device 52 has a lower portion which is of greater diameter than an upper portion. The upper portion of the spring tapers in diameter upwardly and its uppermost end is of such circular diameter that the lower clinch barrel is retained within the spring in the manner shown in FIGURE 2. The upper portion of spring 59 is of such length that it maintains the wire 50 taut between it and the upper wire centering device 51. The lower portion of spring 59 is positioned in the opening 55 of the lower centering device 52 and functions as a base for the upper portion of the spring 59 so that this upper portion will not contact the opening 57 and thereby releases the wire 50 from tension. The lower end of spring 59 contacts an aluminum bus bar 60 which is affixed to the bottom side wall 37 of the front frame 33. The wire 50 is subjected to approximately 5,000 volts D.C. plus from the power pack 29 in the manner to be described hereinafter.

The incoming impure air enters the ionizing unit in the manner shown by the arrows in FIGURE 3.

Immediately downstream the ionizing unit is an inside frame assembly for holding the collecting cell. The inside frame assembly consists of an upstream frame 61 having side walls 62, bottom wall 63, and a top wall 64 (referring to FIGURE 2). These side walls are joined together at the corners. A front face 65 is affixed to the side top and bottom wall. A leg 66 is affixed to the inside surface of the front wall 65 and extends parallel to the side walls. A leg 67 is affixed to leg 66 and extends perpendicular to leg 66. The front face 65, and the legs 66 and 67 are continuous within the frame with the exception of the lower left-hand corner of the frame which has a structure to be described hereinafter.

The downstream frame of the inside frame assembly is of the same construction as the front frame with the exception that it is slightly larger in size so that the upstream frame may slide inside the downstream frame in the manner shown in FIGURE 2. A pad holding grill 68 is inserted between the leg 67 and the front wall 65 of the front inside frame. This pad holding grill is made from .020" perforated aluminum sheet. The perforations are ¼" square and have a .038" bar in a staggered pattern. A U-shaped contact clip 68a is glued to the front wall 65 of the upstream frame. This clip contacts screen 68 and ground electrode 48. Thus, the grill 68 is grounded and substantially completely encloses the ionizing wire 50 with a grounded electrode.

A disposable or cleanable dirt holding pad 70 is positioned behind the grill 68 and within the inside frame assembly. The pad 70 consists of a cotton fiber mesh or netting 71 which has been coated with a conductive material and which has mats of fibrous material on each side as later described. Preferably, the conductive coating is composed of a fire preventative and graphite. However, any other conductive coating on the cotton fiber will serve the purpose of our invention provided that the cotton fiber is fireproof and moisture and fungus resistant. Other materials, such as metallic mesh or wire screen may be substituted for cotton mesh 71.

Positioned on each side of the cotton fiber mesh 71 are mats of fibrous material, for example, material known as "Dynel." "Dynel" is a vinyl chloride acrylonitrile fiber made by the Union Carbide Corporation and is used in the form of non-woven fiber batting for our mats. The "Dynel" is non-hydroscopic, has a high dielectric and is flame resistant. The mats may be made of other fibrous materials such as glass fiber. Such fibrous materials must have a high electrical resistance, be non-hydroscopic, flameproof, capable of holding a static charge, and of a density and thickness such as to form a uniform pad. The material must have body (when compressed it will return to shape).

The "Dynel" pad is held together by a metal binder 73 which is continuous around the edge of the whole pad. To form the pad the cotton mesh 71 is positioned between two mats of "Dynel" 72 and the metal binder 73 positioned around the pad. The cotton mesh 71 must be wider than the "Dynel" to insure contact between the cotton mesh and the metal frame for reasons to be explained hereinafter.

The metal binder 73 is positioned between the legs 67 of the front and rear inner frame in the manner shown in FIGURES 2 and 3, and two frames are pushed tightly together and small L-shaped clips 74 hold the inner frame assembly together.

In the lower left-hand corner of the inside frame is a cutout portion 75. This cutout portion is shown enlarged in FIGURES 13 and 14 and in cross-section in FIGURES 5 and 6. The front inside frame is shown in the upper part of FIGURE 13 and has an L-shaped piece of plastic having legs 76 and 77. The leg 76 has a cutout portion 78 through which extends a brass electrical connector 79. This connector has an inwardly directed leg which extends into the chamber occupied by the pad 70 and contacts the metal frame 73 which encloses the "Dynel" 72 and the cotton mesh 71. The connector 79 is L-shaped and has a leg extending along the outer surface of the plastic leg 76 in the manner shown in FIGURE 5.

The corresponding corner of the rear frame of the inside frame assembly has a similar L-shaped plastic piece having legs 80 and 81 which are glued to the frame in the manner shown in FIGURE 13. A third plastic leg 82 is integral with the legs 80 and 81 and perpendicular to each of these legs. The leg 82 has a circular button 83a affixed to its inside surface 83 as shown in FIGURES 5 and 6. The purpose of this button will be explained hereinafter. The leg 80 has a portion 84 which fits between the previously described leg 77 of the front frame and a corner connector to be described hereinafter. A brass electrical connector 85 is affixed to the portion 84 in the manner shown in FIGURE 6 and extends rearwardly through an opening 86 in the leg 82 and is bent at right angles to the leg 80 to form a contact button 87 on the rear of leg 82 as shown in FIGURE 6.

The contact button 87 engages a grill 88 which is positioned inside the rear frame of the outside frame assembly. The grill 88 is fabricated from .020" perforated aluminum sheet. The perforations are ¼" square and have a .038" bar in a staggered pattern.

Glued to the lower left-hand corner of the inside of the front frame of the outside frame assembly is a corner plug connector 90. The body of this connector is fabricated from plastic such as polystyrenne and has an enlarged front portion 91 and a smaller shank portion 92. Permanently embedded in the front of the connector is a pin 93 positioned in a circular cutoff portion 94. A circular collar 95 is concentrically mounted around the pin 93. The collar 95 is embedded in the connector 90 in the manner shown in FIGURES 5 and 6. The collar 95 extends beyond the front of the enlarged portion 91 and when positioned in the front frame of the outside frame assembly, extends through an opening 96 in the front wall 39 and corner brace. The power pack 29 has a long cord with a plug 97 which is plugged into the opening 94 and provides a high voltage connection with the pin 93 and a ground connection with the collar 95.

The pin 93 is affixed to a brass connector 98 which extends downwardly out of the body of the connector and overlies the bus bar 60 which engages the lower end of the springs 59. In this way, the pin 93 is connected to the wires 50 which are charged with approximately 5,000 volts D.C. positive. The pin 93 is also connected to a second brass contact 99 which extends rearwardly into the shank of the connector 90 and is then bent outwardly and protrudes from the side of the connector in an L-shape 100. The contact 100 is positioned to engage the contact 79 in the corner of the front frame of the inside frame assembly in a manner shown in FIGURE 5.

The collar 95, which is grounded, provides two ground outlets from the connector 90. The first ground outlet contacts the sleeve on its upper side and consists of a contact 101 which is embedded in the enlarged portion of the front of the connector and extends upwardly in an S-shape 102. This is also a spring connection which engages the flattened end portions 49 of the front grill 48. Thus, the front grill is grounded. Likewise, the grill 68 which is affixed to the front frame of the inside frame assembly is grounded due to contact with the grill 48.

A second ground connection consists of a contact 103 which engages the collar and extends rearwardly therefrom to form a spring contact 104. This spring contact is on the upper side of the connector 90 and so positioned that it engages the contact 85 which is affixed to leg 80 of the corner of the rear frame of the inside frame assembly. Thus, the contact 104 provides a ground connection for the contact 85 which engages the rear grill 88 and thereby grounds it.

All of the contacts in the connector 90 are preferably formed from 28 gauge brass. The body of the connector is preferably formed from polystyrene.

The function of the corner connector is to make the proper ground contacts to the front ionizer ground grill, make a proper ground contact to the rear grill, make the proper high voltage contact to the ionizing wires 50, make the proper high voltage contact to the conductive coated cotton mesh 71, and orient the pad within the inside frame assembly.

On the side walls of the outside frame assembly, releasable connectors 106 are integrally united such that they may be moved back to the dash line position shown in FIGURE 3 to release the front frame from the rear frame. The rear frame is thereby lifted off exposing the inside frame assembly. The inside frame assembly is removed from the filter panel and the releasable connectors 74 are pulled outwardly to permit removal of the rear frame from the front frame of the inside frame assembly. The pad 70 can then be removed from a frame assembly for vacuuming or replacement. The lower corner of the metal frame 73 surrounding the "Dynel" 72 and the cotton mesh 71 is cut off in the manner shown in FIGURE 1. Thus, the pad is inserted at this cutoff corner at the position of the corner of the frame having the legs 76 and 77. This ensures proper contact between the metal frame of the pad and the contact 79 of the legs 76. The rear frame is then repositioned outside the front frame of the inside frame assembly and pushed together until the releasable clips 74 are properly engaged. The inside frame assembly is then inserted into the front frame of the outside frame assembly and the bottom 83a fits into an opening 107 of the connector 90 to ensure proper alignment of the inside frame assembly relative to the numerous contacts on the connector 90. It is impossible to improperly insert the inside frame assembly so that proper contact is not made with the connector 90. The rear frame of the outside frame assembly is then positioned over the front frame of the outside frame assembly and pushed inwardly until the releasable clamps 106 are properly engaged as shown in FIGURE 3.

A modified form of collection unit inside the frame assembly is shown in FIGURES 15–23. The ionizing unit in the modified filter panel is identical to that described above with the exception that a loose grill 108 is positioned immediately behind the ground electrode 48. The grill 108 contacts the ground electrode 48 and thus is grounded.

The collecting unit is formed of a cardboard frame 109 having a U-shaped cross-section and being glued together at the corners with the exception of the lower left-hand corner of FIGURE 17 which contains a corner arrangement to be described hereinafter.

The collecting unit inside the paper frame 109 is alternating layers of "Dynel" and conductably coated cotton mesh. The front of the unit has a layer of "Dynel" 110 followed by a layer of conductably coated cotton mesh 111 which, in turn, is followed by a layer of "Dynel" 112 and another cotton mesh 113. A total of four such "Dynel" and mesh layers is interposed inside the cardboard outer frame 109. Around the entire periphery of the "Dynel" corrugated cardboard spacers 114 are inserted to maintain the "Dynel" and cotton mesh tightly wedged within the cardboard frame and to properly space the cotton mesh one from the other.

We have found that by using more electrodes in the collecting medium, a lower voltage can be used for same depth in the direction of air flow.

In the lower left-hand corner of the modified collecting unit, as viewed in FIGURE 17, a corner element is glued in position after the corner has been properly cut out. This corner unit is shown in FIGURE 21 and consists of a pair of legs 115 and 116 which is fixed perpendicular to each other and a third leg 117 which is affixed perpendicular to the legs 115 and 116. Thus, this corner unit is similar to a three-sided tube. The leg 117 has a circular button 117a on its inner surface to engage the opening 107 in the corner connector 90 in the same manner as previously described with respect to button 83a. The leg 115 has a pair of prongs 118 and 119 with the collection unit. These prongs are connected by a contact 120 which is on the inside surface of the leg 115 in the manner shown in FIGURE 19. The prong 118 engages the mesh 113 and the prong 119 engages the rearwardmost mesh 121.

The leg 116 has a similar pair of prongs 122 and 123 which is connected by a contact 124 which is on the inside of leg 116. The prongs 122 and 123 extend inwardly into the collection unit. The prong 123 contacts cotton mesh 111 and the prong 122 contacts cotton mesh 125.

The prongs 122 and 123 do not contact the same mesh as prongs 118 and 119 but rather they contact alternate layers of the mesh.

When the collection unit is properly positioned in the filter panel, the contacts 104 engage contact 120, thereby grounding prongs 119 and 118. The contacts 100 on the corner connector 90 engage contact 124, thereby supplying high voltage to prongs 122 and 123.

The rear grill, similar in structure to the front ground grill, is glued to the rear outside frame and is grounded due to contact with the mesh 121 which is grounded.

A further modification of my filter panel is shown in FIGURES 24–30.

Referring specifically to FIGURES 24–30, the frame of the filter panel is square or rectangular as previously described. The front frame of the filter panel includes continuous peripheral side walls 130, an integral, continuous, inwardly directed front flange 131 and a rear flange 132. The rear flange 132 is affixed to the inside of side walls 130 at a position forward of the rear edge of side walls 130. This frame is fabricated from metal, preferably extruded aluminum. The frame is similar in construction to upstream frame 33 previously described.

The inward edges of flange 131 form an opening 131a for admission of impure air in the direction of arrow 133 shown in FIGURE 25.

A downstream lid 134 is positioned inside the side walls 130 and functions as a closure for the rear of the filter panel. The lid 134 has a continuous metal peripheral frame fabricated from aluminum and H-shaped in cross-section as shown in FIGURE 25. A continuous, inwardly directed opening 135 in the frame admits the entire peripheral edge of a rear metal screen-like grill 136. By squeezing a leg 137, forming one side of opening 135, inwardly, the grill 136 is integrally clamped within the opening 135 and completely encloses the center portion of the lid 134. A second opening 139 is formed by leg 138 and 138a, and contains one end of a spring clamp 140 which extends peripherally outward from the lid 134 and engages the forward side of flange 132, as shown in FIGURE 25. The forward side of leg 138 abuts the inside of side walls 130 and the rear side of flange 132. Numerous clamps 140 are provided on the lid to removably affix the lid to the front frame of the filter.

Dielectric insulators 141 are affixed by any conventional means (preferably, spring clips or screws) to the inside of frame 134. For ease of manufacture, the insulators 141 are preferably truncated cones as shown in FIGURES 24 and 25. The insulators 141 abut and space the filter pad to be described hereinafter from the lid 134.

Immediately behind the opening 131a in the front frame is the ionizing wire assembly. This assembly includes an ionizer ground electrode 48 as previously described, an ionizing wire 50 as previously described, and supports 155 for the ground electrode and ionizing wire. Each of the supports 155 is a continuous, molded member which is affixed to the front flange 131 of the frame. One support 155 is rigidly affixed along the inside bottom wall of the frame, and the other support 155 is rigidly affixed along the inside top wall of the frame. The supports are preferably affixed to the frame with metal spring clips which pass through holes in the flange 131 and into openings in the supports. These supports are preferably molded from a mixture of mica and ground glass which is sintered to form a rigid molded article. The mixture is sold under the name "Havelex." The insulator 155, when viewed in FIGURE 25, appears as a plurality of U-shaped elements 156 integral with each other and with the open portion of the U pointing inward away from the ground electrode 48. The outer surface of the U-shaped elements 156 are shaped to substantially conform with the semi-circular configuration of the ground electrode 48. The U-shaped elements 156 are directed inwardly of the front flange 131 and are molded integral with each other. An inwardly directed leg 157 is spaced from and integral with the bottom surface 158 of the U-shaped elements 156. Each of the U-shaped elements 156 has sidewise projecting legs 159 which forms a small central U-shaped opening 159a in the center of each U-shaped elements 156. A tension spring 160 is positioned in each opening 159a. A clinch barrel 58 is affixed to each end of the ionizing wire 50 and the clinch barrel is retained within the upper and lower springs 160 as shown in FIGURE 26. The ends of the spring 160 are enlarged to prevent the springs from passing through openings 159a. The spring 160 on each end of the ionizing wire 50 maintains a tension on the wire 50, thereby insuring that the wire 50 will be taut between the upper and lower supports 155. The lower end of each bottom spring 160 contacts a metal bus bar 161 which is affixed to the upper side of the leg 157. Bus bar 161 extends the entire length of the bottom support 155.

The lower support 155 has an integral end plug 142 having an opening 143 extending from front to rear through the plug. A hollow metal sleeve 144 is integrally affixed within the opening 143. A coil spring 145 is affixed to the inside of the sleeve 144 and extends rearwardly therefrom, as shown in FIGURE 28. A prong 146 is integral with the front of the sleeve 144 and projects outwardly from the panel in a recessed hole 147 providing an opening in the front of the filter panel. A plug 148 leads from the power pack 29 which has been hereinbefore described and provides a high voltage connection to the prong 146, thereby providing a high voltage connection to the spring 145. A second prong 149 extends inwardly from the plug 148 and enters in opening 150 in the flange 131 of the frame. The prong 149 is grounded, thereby grounding the frame and any parts in contact with the frame, which includes the ground electrode 48. Both the high voltage connection and the ground connection in plug 148 are provided from the power pack in the well-known manner.

A button 150a is integral with the inward end of spring 145 and engages the metal frame 73 of the pad 70. This pad 70 is identical to the pad hereinbefore described with the exception that in this modification of the pad, it is not necessary to provide a cutout portion 75 in the lower left-hand corner.

The lower support 155 has a rearward projection 151 which houses a spring 152. A portion of spring 152 projects rearwardly from projection 151 and has an integral button 152a which engages the metal frame 73 of pad 70. An S-shaped bus connector 153 is affixed to the inside end of spring 152 and downward into spring engagement with the bus bar 161, as shown in FIGURE 27. In use, the high voltage is introduced through plug 148, prong 146, sleeve 144, spring 145 and button 150a. The metal frame 73 of pad 70 then conducts the high voltage to the conductive mesh 71 and also to button 152a and spring 152 which, in turn, conducts the high voltage to bus 161. Each of the springs 160, which maintain a tension on the ionizing wire 50, is in contact with the bus 161 and, therefore, the high voltage is provided to the ionizing wires 50. When pad 70 is removed from the filter panel, the high voltage is not conducted to the ionizing wire whereby the incoming air is not ionized.

The ground electrode 48 fits in tight engagement around the projections 156, on supports 155, as shown in FIGURE 25. The ground electrode extends beyond the edge of the opening 131a formed by flange 131 of the frame. Thus, the ground electrode is held rigidly between the projections 156 of the support and the front flange 131, as shown in FIGURE 24. Preferably the supports 155 are recessed slightly to receive the ground electrode 48 between the supports and flange 131.

A second ground electrode 68 is positioned in contact with the rear of ground electrode 48 in a manner similar to that hereinbefore described. This ground electrode 68 is positioned on the rear of ground electrode 48 and under a plurality of insulators 165 which are affixed to the side walls 130. The insulators 165 are spaced about the periphery of the frame in desired locations to maintain the ground electrode 68 in engagement with the rear of ground electrode 48. The pad 70 also maintains ground electrode 68 in engagement with the rear of electrode 48. The insulators 165 also have flat surfaces 166 against which the frame 73 of pad 70 abuts. Thus, frame 73 is properly maintained in a spaced position from side walls 130.

The supports 155 also have a rearwardly projecting edge 167 against which the metal frame 73 of pad 70 abuts, as shown in FIGURES 24 and 30. The metal frame 73 is thereby spaced from the ground electrodes 48 and 68 and the outside frame of the filter.

The ground electrodes described above and shown in FIGURES 24-30 are the same configuration as the grills previously described in our application.

The operation of our modified filter panel shown in FIGURES 24-30 is substantially the same as the filter panel previously described with the exception of differences already noted.

This application is a continuation-in-part of our prior application Serial No. 803,515, filed April 1, 1959, now abandoned.

A further modification of our pad 70 (not shown) includes a rigid center conductive mesh 71 (preferably metal) which is wrapped with a continuous covering of "Dynel" 72 or the like. Preferably this modified pad includes the center rigid mesh and a covering of "Dynel" which is folded at one end. The modified pad may have a frame 73 around part or all of the pad. The frame must provide the necessary contacts as hereinbefore described.

While we have described a present preferred embodiment of our invention, it may be otherwise embodied within the scope of the following claims.

We claim:

1. An electrostatic filter comprising a pad of filaments having high resistance, means to subject said pad to an electrostatic field, a plurality of ionizing wires adjacent to said pad, a ground electrode completely surrounding each wire such that an ionizing chamber is present around each wire, said electrode being perforated to admit a flow of air having suspended particles, said flow of air being substantially perpendicular to said wires and being directed into one of said chambers and through said pad, and means to supply a high voltage to the ionizing wire, said particles being charged by the ionizing wire in the ionizing chamber and collected and retained by said pad.

2. A filter according to claim 1 wherein said pad includes at least one conductive mesh interposed within the filaments, a grounded mesh positioned on each side of the filaments, and means to supply high voltage to said conductive mesh such that said filaments are subjected to an electrostatic field.

3. An electrostatic filter panel having a thickness less than about two inches in the direction of air flow comprising an outer frame having an air inlet and an air outlet, a pad of high electrical resistance fibers removably positioned crosswise within the frame, a plurality of ionizing wires rigidly positioned crosswise within the frame between said pad and said inlet, a first grounded metal grill affixed to said frame between said inlet and said wires, the grill having perforations for admission of air bearing particles to be removed by the filter, individual portions of the grill forming a three-sided enclosure for each of said wires such that air flowing through the perforations flows around the wires to ensure charging of said particles, a second grounded perforated metal grill positioned between said wires and said pad, said second grill being adjacent said wires to provide a complete enclosure around the wires and a front ground electrode for said pad, a conductive mesh within said pad to subject the fibers to an electrostatic field, and a high voltage power source connected to said wires and mesh.

4. A panel according to claim 3 wherein said pad is enclosed within an easily removable inside frame separable into front and rear portions, one corner of said frame having a contact extending inward of the frame to engage said conductive mesh, said contact having a portion on the outside of the frame engageable with said power source, a corner connector affixed to said outer frame and providing a high voltage power source and a ground connection, said corner connector having a plurality of ground contacts, one ground contact engaging said first metal grill, the other ground contact engaging a third perforated metal grill positioned between said pad and said outlet, a plurality of high voltage contacts on said corner connector, one high voltage contact engaging the contact on the corner of the inside frame, and the other high voltage contact engaging a conductive means which engages said ionizing wire.

5. A panel according to claim 3 wherein said pad is enclosed within an easily removable inside frame separable into front and rear portions, a contact extending inwardly of the frame to engage said conductive mesh, said contact having a portion on the outside of the frame engageable with said power source, a connector affixed to said outer frame and providing a high voltage power source and a ground connection, said connector having a plurality of ground contacts, one ground contact engaging said first metal grill, the other ground contact engaging a third perforated metal grill positioned between said pad and said outlet, a plurality of high voltage contacts on said connector, one high voltage contact engaging the contact on the inside frame, and the other high voltage contact engaging a conductive means which engages said ionizing wire.

6. A panel according to claim 5 wherein said inside frame has an integral pin located in the proximity of the connector, and said connector has an opening the size and shape of said pin, whereby said pin will enter said opening when the inside frame is positioned within the outer frame to accurately align the frames relative to each other, thereby ensuring proper contact between said connector and the inside frame.

7. A panel according to claim 3 wherein said individual portions of the grill are semi-circular in shape, the sides of said three-sided enclosure being unperforated, wire centering devices releasably positioned in each end of said portions of the first grill, said devices being fabricated of electrical insulating material and spaced from each other, the devices on one end of the grill being hollow and having springs positioned in said hollows, each of said wires being stretched between a pair of said devices positioned at opposite ends of said first grill, said wires passing into the hollows in said devices and into the springs in said devices at the one end of the grill, a portion of the springs being in tension to maintain the wires taut, a second portion of the springs being in compressive engagement with said high voltage power source.

8. An electrostatic filter panel consisting essentially of a four-sided frame, the ends of the frame being open, a first rigid dielectric insulator integral with and extending along the inside of a first side of said frame, a second rigid dielectric insulator integral with and extending along the inside of a second side of said frame, said first and second sides and said insulators being in face-to-face relationship adjacent one of said open ends of the frame, a plurality of ionizing wires extending between said first and second insulators, each of said insulators having a plurality of openings, the openings in one of the insulators facing the openings in the other insulator, a spring mounted in each of said openings, an end of one of said ionizing wires extending into and fixed within each of said springs, a single ionizing wire being stretched between each of sad openings facing each other, each of said springs being mounted in an opening in the insulators such that the spring maintains the ionizing wire affixed to it in tensioned condition, means to supply high voltage to the ionizing wires through said springs, a first screen-like ground electrode mounted on and extending between said insulators, portions of the ground electrode being of semi-circular configuration, each of said semi-circular portions being positioned around and equally spaced from one of said ionizing wires, a plurality of the semi-circular portions extending across and closing said one open end of the frame, a second screen-like ground electrode removably positioned in contact with said first ground electrode and enclosing the rear open part of said semi-circular portions of said first ground electrode to completely enclose each of said ionizing wires within said ground electrodes, means to ground said ground electrodes, a pad of high resistance filaments positioned immediately adjacent said second ground electrode, and means to subject said pad to an electrostatic field, the flow of air to be purified being substantially perpendicular to said ionizing wire.

9. A filter according to claim 8 wherein said pad includes a conductive mesh interposed within the filaments, said second ground electrode being positioned on one side of the pad, a third ground electrode positioned on the other side of the pad, and means to supply high voltage to said conductive mesh such that said filaments are subjected to an electrostatic field.

10. An electrostatic filter comprising a frame having an air inlet and an air outlet, a first metal screen-like grill enclosing the inlet, a plurality of integral portions of said first grill being semi-circular in transverse cross-section, first and second elongated insulators affixed to the frame near said inlet, said insulators being in opposed spaced face-to-face relationship to each other, portions of each insulator having projections of semi-circular transverse cross-section substantially the same as said first grill, said portions of the first grill being positioned in locking engagement around individual projections such that said grill is maintained stationary relative to the insulators and frame, an ionizing wire positioned within and parallel to the sides of each of said portions of the first grill, a helical spring affixed to each end of each ionizing wire, an opening in each projection of each insulator, one of said springs positioned removably in each of said openings to maintain the ionizing wire affixed to the springs in tensioned condition, a second screen-like grill positioned within said frame and enclosing the open part of said semi-circular portions of the first grill to completely enclose each ionizing wire within said grills, means to ground said grills, a removable pad of high resistance fibers extending crosswise within the frame between said second grill and said outlet, a metal frame affixed along at least one side of the pad; a high voltage electrical contact on said filter; a first spring biased contact between said high votlage contact and said frame; a second spring biased contact operatively connected between said frame and ionizing wires; a high voltage power source normally supplying power through said high voltage contact, first spring biased contact, said metal frame on the pad, the second spring biased contact and to the ionizing wires; said pad being removable to break the power flow to said wires, and a third screen-like grill across the outlet of said filter.

11. A filter according to claim 1 wherein said ground electrode is substantially uniformly spaced on all sides from the ionizing wire.

12. A filter according to claim 1 wherein said ground electrode is D-shaped in cross-section; one of said ionizing wires being substantially centrally positioned within each of said ground electrodes; and said flow of air entering said ground electrode through perforations in the curved portion of the D and exiting through the flat portion of the D.

13. A filter according to claim 1 wherein imperforate portions of said ground electrode are located on the sides of said wires and substantially parallel to said air flow.

References Cited in the file of this patent

UNITED STATES PATENTS

| | | |
|---|---|---|
| 2,588,111 | Hanneman | Mar. 4, 1952 |
| 2,589,463 | Warburton | Mar. 18, 1952 |
| 2,822,058 | Roos et al. | Feb. 4, 1958 |

FOREIGN PATENTS

| | | |
|---|---|---|
| 716,258 | Great Britain | Sept. 29, 1954 |